(12) United States Patent
Ryan et al.

(10) Patent No.: US 9,637,081 B2
(45) Date of Patent: May 2, 2017

(54) CURTAIN AIRBAG WITH PROTECTIVE SHEET

(71) Applicants: Ford Global Technologies, LLC, Dearborn, MI (US); TRW Vehicle Safety Systems, Inc., Livonia, MI (US)

(72) Inventors: Sean Timothy Ryan, Farmington Hills, MI (US); Joseph Edward Abramczyk, Farmington Hills, MI (US); Abdelmonaam Sassi, Windsor (CA); Michal Jan Swiniarski, Brentwood Essex (GB); Barry Grindle, Essex (GB); Jeffrey Charles Paddock, Dearborn Heights, MI (US); Marcus John Scott Ward, Essex (GB); Jay Blackson, Bruce Township, MI (US); Joseph Giaimo, Bruce Township, MI (US)

(73) Assignees: Ford Global Technologies, LLC, Dearborn, MI (US); TRW Vehicle Safety Systems, Inc., Livonia, MI (US)

( * ) Notice: Subject to any disclaimer, the term of this patent is extended or adjusted under 35 U.S.C. 154(b) by 95 days.

(21) Appl. No.: 14/330,346

(22) Filed: Jul. 14, 2014

(65) Prior Publication Data
US 2016/0009246 A1   Jan. 14, 2016

(51) Int. Cl.
*B60R 21/231*   (2011.01)
*B60R 21/21*    (2011.01)
(Continued)

(52) U.S. Cl.
CPC ........ *B60R 21/23138* (2013.01); *B60R 21/08* (2013.01); *B60R 21/21* (2013.01);
(Continued)

(58) Field of Classification Search
CPC . B60R 21/23138; B60R 21/08; B60R 21/232; B60R 21/21; B60R 21/215; B60R 2021/0006; B60R 21/213
See application file for complete search history.

(56) References Cited

U.S. PATENT DOCUMENTS 6,474,686 B1 *  11/2002  Higuchi ................ B60R 21/203
                                              280/731
6,517,110 B1 *   2/2003  Butters ................. B60R 21/201
                                              280/730.2
(Continued)

*Primary Examiner* — Paul N Dickson
*Assistant Examiner* — Joselynn Y Sliteris
(74) *Attorney, Agent, or Firm* — Frank A. MacKenzie; Brooks Kushman P.C.

(57) ABSTRACT

A curtain airbag for a motor vehicle includes an inflatable cushion and a protective sheet having an attachment edge attached to the airbag and a free-length extending from the attachment edge. The cushion formed into a folded condition from which it is deployable in a deployment direction, and the free-length of the sheet is positioned adjacent to the deployment direction of the cushion. The airbag is installed in the vehicle to deploy adjacent to a daylight opening of the vehicle. Deployment of the cushion during inflation causes the protective sheet to be drawn along with the cushion in the deployment direction so that the sheet overlays the outboard-facing side of the cushion (between the cushion and the daylight opening) and thereby provides a degree of protection against damage to the cushion that may be caused by, for example, broken window glass.

11 Claims, 4 Drawing Sheets

(51) Int. Cl.
*B60R 21/215* (2011.01)
*B60R 21/232* (2011.01)
*B60R 21/08* (2006.01)
*B60R 21/00* (2006.01)

(52) U.S. Cl.
CPC .......... *B60R 21/215* (2013.01); *B60R 21/232* (2013.01); *B60R 2021/0006* (2013.01)

(56) References Cited

U.S. PATENT DOCUMENTS

| | | | | |
|---|---|---|---|---|
| 6,793,239 B2* | 9/2004 | Feldman | ........... | B60R 21/23184 280/729 |
| 6,877,768 B2* | 4/2005 | Fujiwara | ............... | B60R 21/232 280/730.2 |
| 6,883,826 B2* | 4/2005 | Fujiwara | ............. | B60R 21/2346 280/730.2 |
| 6,893,045 B2* | 5/2005 | Inoue | ...................... | B60R 13/02 280/730.2 |
| 6,938,920 B2* | 9/2005 | Inoue | ...................... | B60R 13/02 280/730.2 |
| 6,986,528 B2* | 1/2006 | Inoue | ...................... | B60R 13/02 280/730.2 |
| 7,182,366 B2* | 2/2007 | Enriquez | ............... | B60R 21/213 280/728.2 |
| 8,152,196 B2 | 4/2012 | Choi et al. | | |
| 8,276,936 B2* | 10/2012 | Shimizu | ................ | B60R 21/201 280/728.2 |
| 8,500,162 B2* | 8/2013 | Moffitt | .................. | B60R 21/232 280/730.2 |
| 9,266,492 B2* | 2/2016 | Byun | .................... | B60R 21/213 |
| 2002/0122908 A1 | 9/2002 | Li et al. | | |
| 2006/0205302 A1 | 9/2006 | Woydick | | |
| 2008/0042414 A1 | 2/2008 | Nagaoka | | |
| 2010/0181744 A1 | 7/2010 | Crouch | | |
| 2011/0127755 A1* | 6/2011 | Beppu | .................. | B60R 21/232 280/730.2 |
| 2016/0311393 A1* | 10/2016 | Smith | .................. | B60R 21/232 |

* cited by examiner

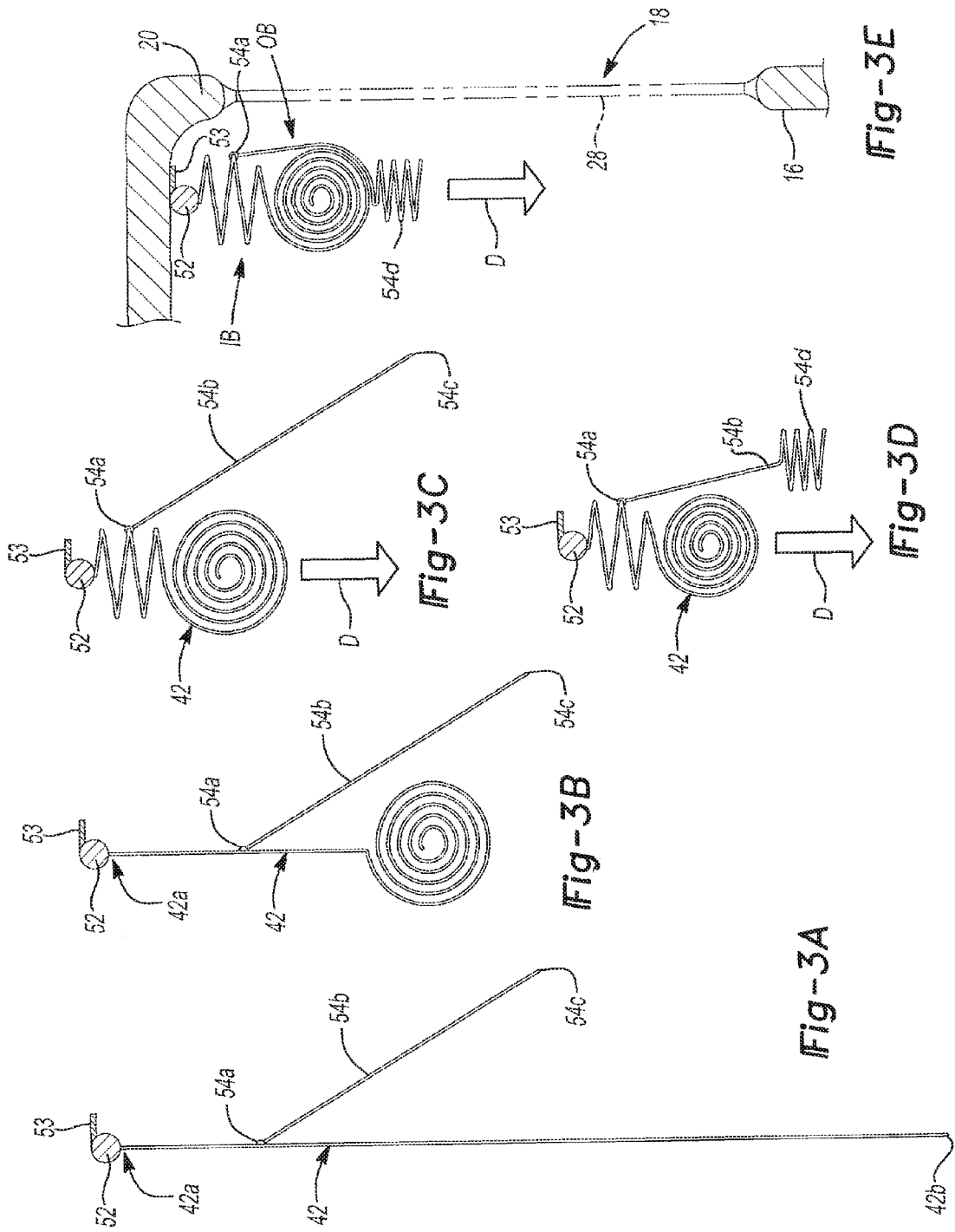

CURTAIN AIRBAG WITH PROTECTIVE SHEET

TECHNICAL FIELD

The invention relates to curtain airbag systems used for occupant protection in motor vehicles.

BACKGROUND

Curtain airbags are inflatable devices intended to protect occupants from injury during accidents such as side impacts or rollover events. Curtain airbags are generally located along the sides of the vehicles either above or below the side daylight openings and, when inflated, cover the interior (inboard) surfaces of the side windows, roof support pillars (A-, B-, and/or C-pillars, etc.), and adjacent portions of the vehicle side structure.

During a accident involving a side impact it is possible for the side window panels to break. During vehicle safety testing that simulates the side of the vehicle striking a pole it has been found that the curtain airbag may be punctured if pieces of the broken window panel are forced against the curtain airbag by the pole during deployment of the curtain.

It is possible to reduce the likelihood of such damage by constructing the airbag from a more puncture-resistant material. Such a material may, however, be thicker, heavier, and/or stiffer than materials more commonly-used in airbag cushions and thus may take up more space when folded for storage and/or may take longer to deploy. Also, if it is found during testing that only a relatively small portion of the airbag surface is prone to damage, it may be necessary to reinforce only these relatively small areas.

SUMMARY

In a disclosed embodiment, a curtain airbag installed in a motor vehicle, comprises an inflatable cushion folded for deployment in a deployment direction adjacent to a daylight opening of the vehicle, and a protective sheet having an attachment edge secured to the airbag and/or to the vehicle at an outboard side of the folded cushion. A free-length of the sheet extending from the attachment edge is disposed adjacent to the deployment direction of the folded cushion. Deployment of the cushion during inflation causes the protective sheet to be drawn along with the cushion in the deployment direction so that the sheet overlays the outboard-facing side of the cushion to provide a degree of protection against damage to the cushion that may be caused by, for example, broken window glass.

In a further embodiment, at least one attachment point on the attachment edge is co-located with a zero-length tether connecting an inboard panel and an outboard panel of the cushion.

In a further embodiment, a distal end of the free-length is folded and positioned adjacent to the deployment direction of the folded cushion.

In a further embodiment, the free-length is wrapped around the deployment direction of the cushion and positioned on an inboard side of the folded cushion.

In a further embodiment, a distal end of the free-length is folded and positioned on the inboard side of the folded cushion.

A method of folding a curtain airbag is also disclosed, the curtain comprising an inflatable cushion and a sheet having an attachment edge attached the airbag and/or to a vehicle. The method comprises folding the cushion into a folded condition from which it is deployable in a deployment direction, and subsequently positioning a free-length of the sheet extending from the attachment edge adjacent to the deployment direction of the cushion. Deployment of the cushion during inflation causes the protective sheet to be drawn along with the cushion in the deployment direction so that the sheet overlays the outboard-facing side of the cushion and thereby provides a degree of protection against damage to the cushion that may be caused by, for example, broken window glass.

In a further embodiment of the method, the positioning step further comprises wrapping the free-length around the deployment direction of the folded cushion to position a portion of the free-length on a side of the folded cushion opposite from the attachment edge.

In a further embodiment, the method further comprises folding the portion of the free-length positioned on the side of the folded cushion opposite from the attachment edge.

In a further embodiment of the method, the positioning step further comprises folding a distal end of the free-length and wrapping an un-folded portion of the free-length around the deployment direction to position the folded distal end adjacent to a side of the stowed cushion opposite from the attachment edge.

In a further embodiment of the method, the positioning step further comprises folding a portion of the free-length adjacent to the attachment edge and positioning the folded portion adjacent to a side of the folded cushion having the attachment edge.

BRIEF DESCRIPTION OF THE DRAWINGS

Embodiments of the present invention described herein are recited with particularity in the appended claims. However, other features will become more apparent, and the embodiments may be best understood by referring to the following detailed description in conjunction with the accompanying drawings, in which:

FIGS. 3A-3E schematically show a sequence of steps in a method of folding a curtain airbag cushion and protective sheet;

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
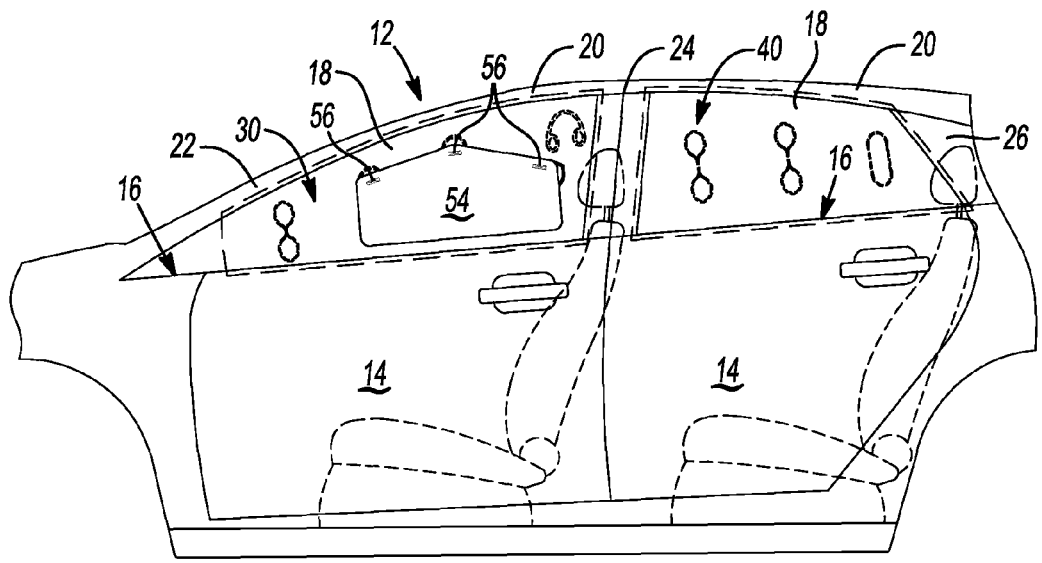
FIG. 1 is a schematic view of a vehicle interior including a multi-row curtain airbag.

FIG. 1 schematically and generally shows a typical motor vehicle to include a side body structure 12 comprising front and rear doors 14. The doors 14 have upper edges or sills 16 which define the lower edges of side daylight openings 18. A roof rail 20 defines the upper edges of daylight openings 18. Forward and rear edges are defined by roof support pillars such as A-pillar 22, B-pillar 24, and C-pillar 26.

Although the present figures depict a sedan-type vehicle having two seating rows (front and rear) and two doors on each side, the invention is also applicable to a vehicle having any number of seating rows and/or doors and/or daylight openings divided by pillars and/or fixed (non-opening) body panels (not shown). Also, while only the left side of the vehicle body structure is shown, but it is to be understood that the right side of the body structure is substantially identical.

A front-row and a rear-row curtain airbag 30, 40 are shown in their fully inflated and deployed positions inside of the vehicle adjacent to side daylight openings 18. As is well known in the art, curtain airbags are installed in the vehicle in a stowed (deflated and folded) condition (see FIGS. 4-8) along edges of the daylight opening(s). In the depicted embodiment, airbags 30, 40 are installed along the upper edge of the daylight openings, adjacent to roof rail 20. Front-row curtain airbag 30 may extend forward and downward along the A-pillar 22, and/or rear-row curtain airbag 40 may extend rearward and downward along the C-pillar 26.

Front- and rear-row airbags 30, 40 are depicted as being separately inflatable, in which case they may be joined to one another by external tethers (not shown) at their adjacent edges, generally along B-pillar 24. As is well known in the art, a single, multi-row airbag may also be used, without departing from the scope of the present invention.

In some vehicles, such as those with retractable roofs (convertibles), it is known to install curtain airbags along the door sill 16 such that they deploy upward generally parallel to the daylight opening 18. The present invention is not limited to a curtain airbag installed above the daylight opening and deploying downward.

Figure 2:
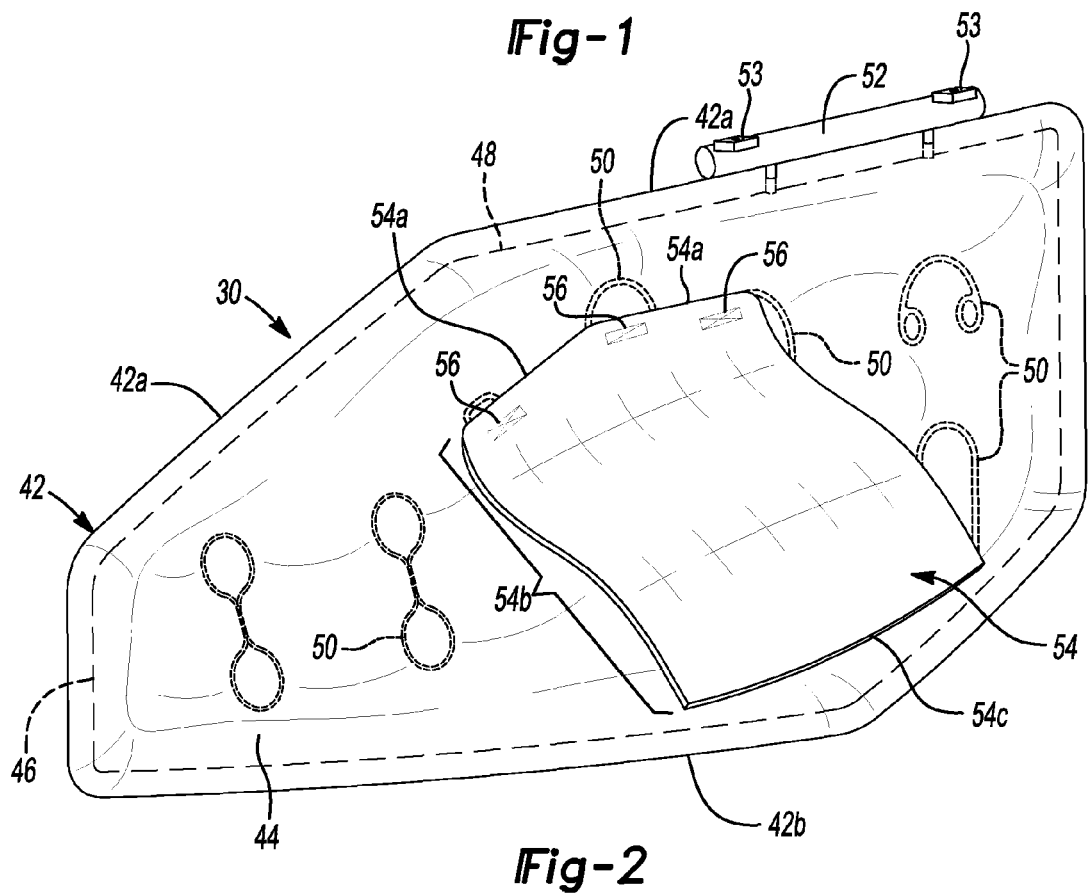
FIG. 2 is a schematic perspective view of a curtain airbag with a protective sheet.

FIG. 2 shows front-row curtain airbag 30 removed from the vehicle and in an unfolded condition. Curtain airbag 30 comprises a cushion 42 having an outboard panel 44 and an inboard panel 46 (not visible in FIG. 2) joined around their common periphery to form at least one inflatable, substantially gas-tight chamber.

Curtain airbag 30 further comprises an inflator 52 supplying inflation gasses to the cushion 42. Inflator 52 may comprise a compressed gas cylinder or a pyrotechnic device, as is well known in the art, and is in fluid connection with the cushion via one or more inflation tubes. Inflator 52 may be attached to the cushion 42 so that the airbag 30 may be fabricated as a unitary module that is installed in the vehicle during the vehicle assembly process.

For purposes of clarity of description, cushion 42 is said to have an inflation edge 42a and a distal edge 42b. The inflation edge 42a is defined as that edge at which inflation gasses enter the cushion and from which deployment of the bag propagates. Inflator 52 is located at the inflation edge 42a in the depicted embodiment, but this may not necessarily be the case in all vehicle installations. Distal edge 42b is defined as the edge generally opposite from inflation edge 42a.

The cushion's inboard and outboard panels 46, 44 may be joined by stitching (as generally indicated at 48) or any other appropriate technique (adhesive, heat bonding, one-piece woven construction, etc.). Panels 44, 46 are made from a flexible, substantially gas-impermeable material, such as a synthetic cloth (nylon or polyester, for example) coated with silicone, polyurethane, or other appropriate material, as is well known in the art. Panels 44, 46 may also be connected to one another at one or more locations within the periphery of the cushion by internal tethers 50, as is well known in the art. Tethers 50 may be located to achieve a desired shape/thickness of the cushion 42 when inflated and/or to provide advantageous flow paths for the inflation gases. One or more of tethers 50 may comprise a "zero-length" tether, where the inboard and outboard panels of the cushion are stitched directly to one another. The stitching used to attach and/or form the tethers 50 is indicated using dashed lines.

Curtain airbag 30 may further comprise one or more mounting tabs 53 used to secure the airbag to the vehicle structure (such as roof rail 20 and/or pillars 22, 24, 26). The curtain airbag 30 is usually installed behind vehicle interior trim components, which are not shown for clarity of illustration. During installation of the airbag 30, it is electrically connected to the vehicle electrical system and/or a restraints control module (not shown) which controls activation during a detected crash event, as is well known in the occupant protection art.

Airbag 30 further comprises a protective sheet 54 secured to the cushion 42 along an attachment edge 54a of the sheet. A free-length 54b of the sheet extending from the attachment edge is unrestrained relative to the cushion 42. In the depicted embodiment of a downward-deploying curtain airbag, attachment edge 54a is generally adjacent to sheet's upper edge and the free-length 54b drapes downwardly toward a distal edge 54c of the sheet.

Sheet 54 may be made of a fabric material similar to that used for the cushion 42, but since the sheet does not have to hold gas pressure there is no need for the fabric to be treated with a gas-impermeable coating. Eliminating the coating may be expected to reduce the amount of friction or drag between sheet 54 and cushion 42, and so result in less resistance to rapid deployment of the cushion.

In the depicted embodiment, three attachment points 56 define the attachment edge 54a. Attachment points 56 may, for example, comprise short lengths of stitching. To simplify fabrication of the airbag 30, it may be advantageous to locate the attachment points 56 on non-inflated portions of the cushion 42. For example, the depicted embodiment shows attachment points 56 coinciding with the tethers 50. This placement of attachment points 56 is particularly advantageous in the case of zero-length tethers, since the cushion is not inflated at the zero-length tethers so that the stitching involved will not create any risk of gas leakage from the cushion when inflated. Alternatively or in addition, sheet 54 may be attached to a non-inflated portion of the cushion outside of the peripheral stitching 48, or to some other portion of the airbag or vehicle, as further described below.

FIGS. 3A-E schematically depict a series of steps in folding curtain airbag 30 into a stowed condition for installation in a vehicle. Initially, as seen in FIG. 3A, the cushion 42 is deflated and flattened and free-length 54b of sheet 54 is pulled away from the cushion. In FIG. 3B, a lower portion of cushion 42 (at least the portion lower than the attachment edge 54a of the sheet) is folded using a technique that is commonly referred to in the airbag industry as an "outboard roll": Beginning at the distal edge 42b, the cushion is rolled in a spiral fashion toward the side of the curtain airbag 30 that will face the exterior (or outboard side) of the vehicle when the airbag is installed in the vehicle (counter-clockwise as viewed in the present figures).

In FIG. 3C, the remaining, unrolled portion of the cushion adjacent to inflation edge 42a is folded in an accordion or Z-shaped pattern. The thickness (vertical dimension, as viewed in the figures) of the Z-folded portion is exaggerated for clarity of illustration, as an actual curtain airbag is folded in a manner to be as compact as practical. Folding the curtain airbag 30 in the manner shown establishes a deployment direction D along which the deployment of the cushion 42 propagates during inflation, away from inflation edge 42a.

The nature and combination of steps used to fold the cushion 42 is not a limitation on the practice of the present invention, as many other folding techniques are well-known in the art. For example, the cushion 42 may be rolled toward the inboard side or the entire length may be Z-folded. Regardless of the folding steps employed, the folded curtain airbag has a deployment direction D.

As shown in FIGS. 3B and 3C, free-length 54b of the sheet 54 remains pulled away from the cushion 42 during the folding steps, so that the sheet is not folded along with the cushion.

In FIG. 3D, the lower portion of the free-length 54b is folded into, for example, a Z-shape indicated at 54d. As with the folded cushion 42, the thickness of the Z-folded portion 54d is exaggerated for clarity of illustration. The free-length 54b (including the folded portion 54d) is then positioned adjacent to the surface of folded cushion 42 that faces in the deployment direction D, as shown in FIG. 3E. Airbag 30 may be retained in the folded or stowed configuration shown by one or more temporary straps (not shown for clarity) that break or otherwise release the cushion 42 and sheet 54 during curtain deployment.

FIG. 3E also shows airbag 30 mounted to the roof rail 20 of a vehicle adjacent to side daylight opening 18 by, for example, threaded fasteners (not shown) passing through mounting tabs 53 and engaging the roof rail. For clarity of illustration, many well-known components or elements of a typical curtain airbag installation environment are omitted. For example, a headliner (not shown) and/or other interior components (not shown) may cover the airbag 30 so that it is not visible from within the vehicle.

When installed in a vehicle, the stowed or folded (undeployed) curtain airbag 30 has an outboard side OB oriented toward daylight opening 18 and an inboard side IB oriented toward the vehicle interior. It should be noted that the outboard OB and inboard IB and sides of the folded airbag 30 do not necessarily coincide with the outboard and inboard panels 44, 46 of the cushion. For example, the "outboard roll" folding technique illustrated herein results in the inboard panel 46 of the cushion 42 being exposed on the outside of the spiral roll, and thus being oriented toward both the inboard side IB, the outboard side OB (as well as toward the deployment direction D) of the folded cushion.

Figure 4A:
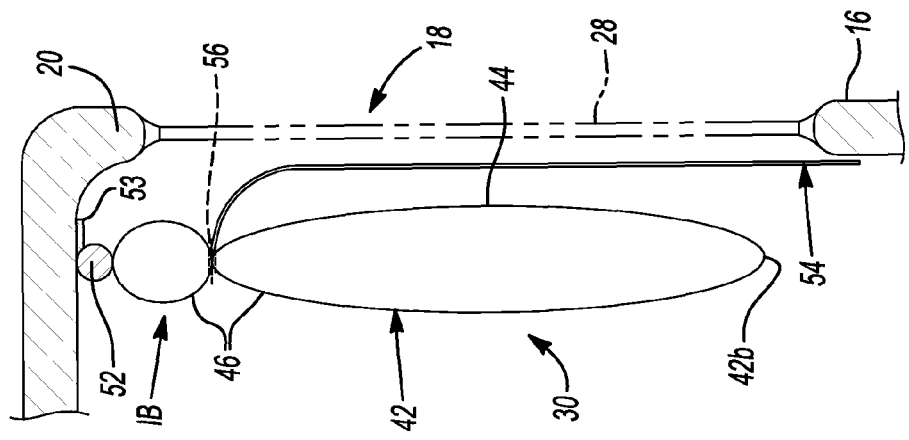
FIG. 4A is a schematic cross-sectional view of a curtain airbag in a folded condition.

FIG. 4A schematically depicts an alternative configuration of a stowed curtain airbag 30 differing from that of FIG. 3E in that the free-length 54b of the sheet is wrapped around the deployment direction so that the Z-fold portion 54d is positioned adjacent to the inboard side IB of the folded cushion 42. In this configuration, a portion of the free-length 54b between the attachment edge 54a and the Z-fold portion 54d is disposed adjacent to the deployment direction D. As with the FIG. 3E embodiment, the deployment direction D of the folded airbag is generally parallel to the plane of the daylight opening 18 and/or window pane 28. The Z-folded portion 54d may be positioned anywhere between directly aligned with the deployment direction D (the six-o'clock position relative to the airbag 30, as in FIG. 3E) and extending clockwise around the airbag to a position adjacent to the roof rail 20

Figure 4B:
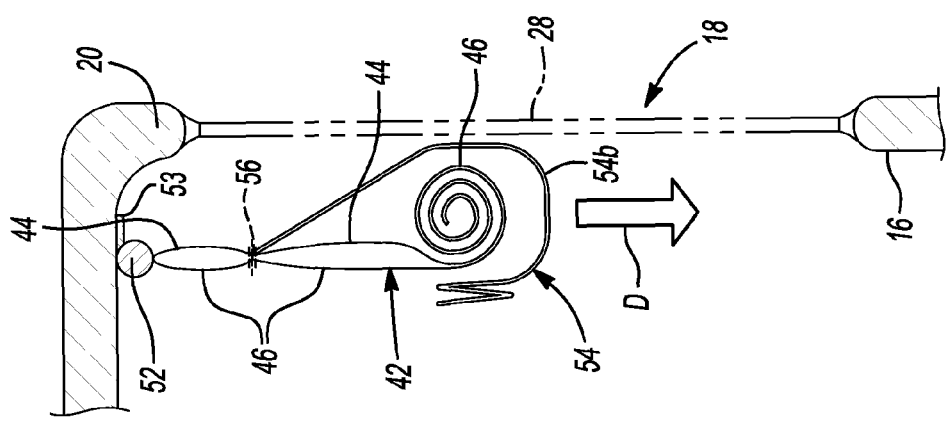
FIG. 4B is the airbag of FIG. 4A early in the inflation process.

In FIG. 4B curtain airbag 30 is shown in a partially inflated state in which the cushion 42 has begun to unfold downwardly in the deployment direction D. The upper, Z-folded portion of cushion 42 is substantially unfolded (inflated), and the spiral-rolled lower portion has just begun to unroll. The free-length 54b of sheet 54 is still wrapped around the lower portion of the unrolling cushion 42, covering the inboard panel 46 that would otherwise be in direct contact with the window pane 28. Sheet 54 therefore helps protect cushion 42 from being punctured or otherwise damaged during deployment of the cushion airbag by, for example, broken window glass. The sheet 54 causes only a minimal amount of resistance to deployment of cushion 42 and therefore does not significantly slow the deployment.

Figure 4C:
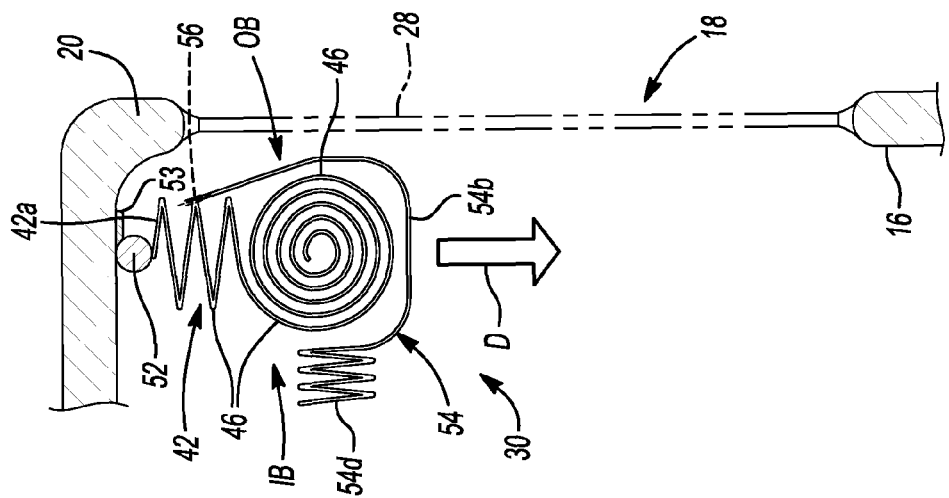
FIG. 4C is the airbag of FIGS. 4A and 4B in a fully inflated condition.

FIG. 4C shows the curtain airbag 30 in the fully deployed position wherein the sheet is 54 is disposed between the inflated cushion 42 and the daylight opening 18. It may not be necessary for sheet 54 to cover the entire vertical extend of daylight opening 18, as shown in FIG. 4C. If testing or real-world experience indicates that only a portion of the length of the cushion 42 is prone to damage during deployment, protective sheet 54 may be sized and positioned accordingly to cover only that particular area.

Figure 5:
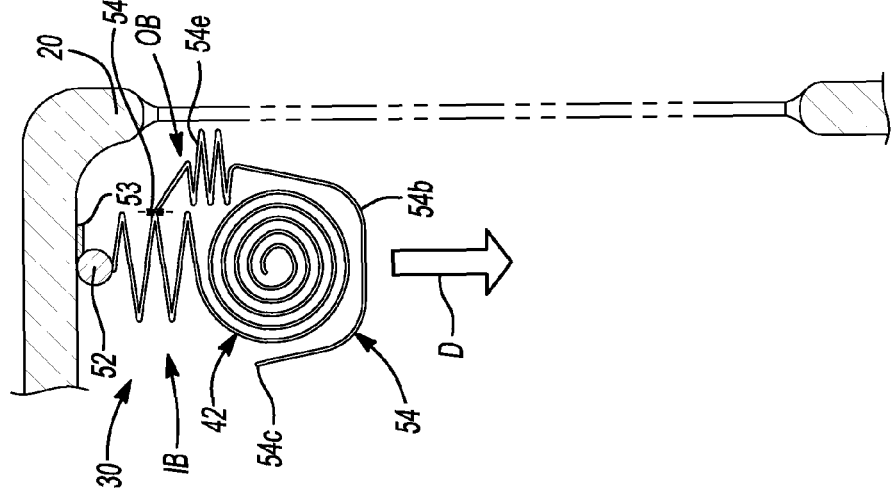
FIG. 5 is a schematic view showing an alternative embodiment of a curtain airbag with a protective sheet folded and stowed on the outboard side of the cushion.

FIG. 5 depicts an alternative configuration of a folded curtain airbag 30 in which the lowermost end of free length 54b is passed or wrapped around the deployment direction D and a portion of the sheet is folded into a Z-fold 54e and packed adjacent to the outboard side OB of the folded cushion 42. In this configuration, a portion of the free-length 54b between the distal edge 54c and the Z-folded portion 54e is disposed adjacent to the deployment direction D.

Figure 6:
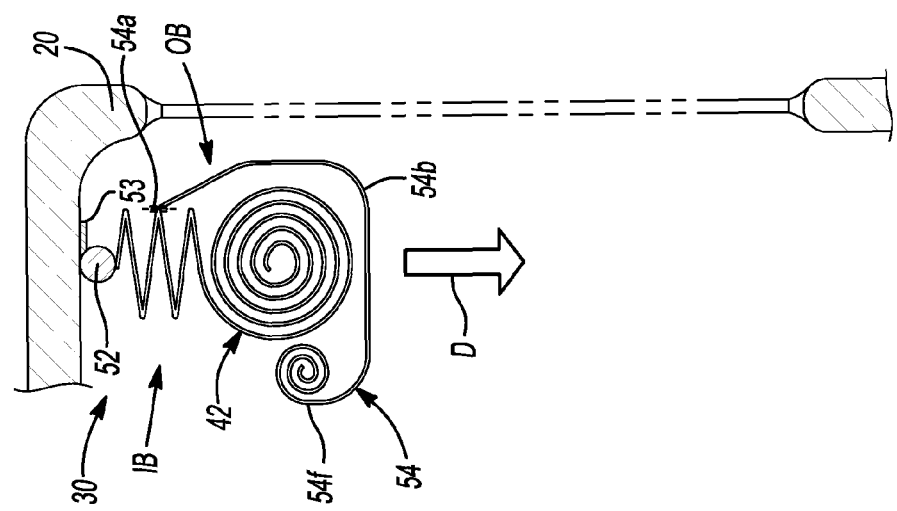
FIG. 6 is a schematic view showing a second alternative embodiment of a curtain airbag with a protective sheet folded and stowed in a different manner.

FIG. 6 shows another alternative configuration of a folded curtain airbag 30 in which the distal end of the sheet 54 is rolled in a spiral fashion. The free-length 54b is then wrapped around the deployment direction D and the spiral-rolled portion 54f is positioned adjacent to the inboard side IB of the folded cushion 42. In this configuration, a portion of the free-length 54b between the attachment edge 54a and the rolled portion 54f is disposed adjacent to the deployment direction D. The spiral-rolled portion 54f may alternatively be positioned adjacent to the deployment direction D, similar to the placement of the Z-fold portion 54d shown in FIG. 3E.

In all of the embodiments of FIGS. 3 through 6, at least a portion of the sheet free-length 54b is disposed adjacent to the deployment direction D of cushion 42. This configuration causes the cushion 42, as it unfolds during inflation, to draw the sheet 54 along with it in the deployment direction. The sheet 54 thus remains between the cushion 42 and the daylight opening 18 throughout the deployment sequence.

Figure 7:
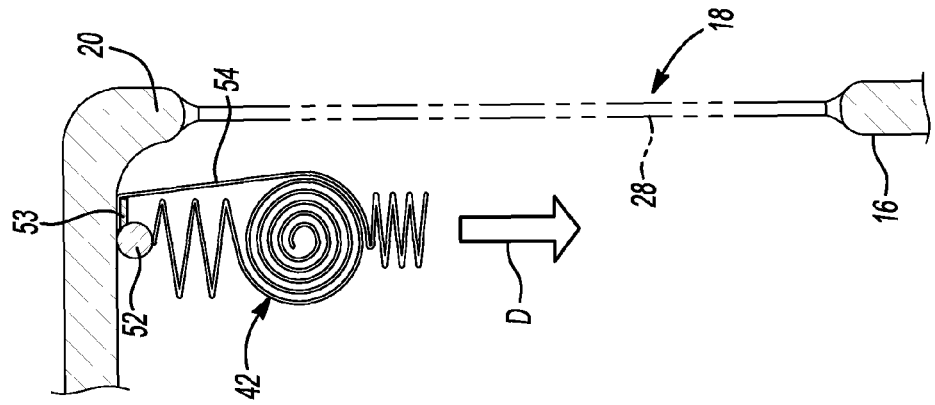
FIG. 7 is a schematic view showing a protective sheet secured between the airbag and the vehicle.

FIG. 7 shows a further alternative embodiment of a curtain airbag 30 in which sheet 54 (rather than being secured to the cushion 42) is secured relative to the airbag 30 and to the vehicle by trapping its uppermost edge between the vehicle and the airbag itself during installation of the airbag into the vehicle. For example, sheet 54 may be trapped between airbag mounting tab(s) 53 and the roof rail 20 as shown.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle curtain airbag comprising:
    an inflatable cushion folded for deployment; and
    a sheet having
        an attachment edge secured to the cushion at a location below an upper edge of a window, at an outboard side of the cushion, and adjacent an edge of the window, and
        a folded portion positioned on an inboard side of the cushion that unfolds and extends between the window and an outboard surface of the cushion during deployment.

2. The curtain airbag of claim 1 wherein at least one attachment point on the attachment edge is co-located with a zero-length tether connecting an inboard panel and an outboard panel of the cushion.

3. The curtain airbag of claim 1 wherein at least a portion of the cushion is adjacent to the upper edge of the window and the cushion deploys toward a lower edge of the window.

4. The curtain airbag of claim 1 wherein the folded portion is a Z-fold.

5. A curtain airbag for a motor vehicle having a stowed condition wherein:
    an inflatable cushion is folded for deployment overlying a vehicle window; and
    a sheet has an edge, wherein at least one attachment point on the edge is co-located with a zero-length tether connecting an inboard panel and an outboard panel of the cushion, the edge is secured to the cushion adjacent to an outboard side of the cushion and a Z-folded portion is positioned inboard of the folded cushion, the Z-folded portion having a length to, when unfolded by deployment of the cushion overlying the window, extend between the window and an outboard surface of the cushion.

6. The curtain airbag of claim 5 wherein the cushion is folded such that the inboard panel of the cushion contacts the sheet.

7. The curtain airbag of claim 5 wherein the sheet is attached to the cushion at a plurality of attachment points along the edge.

8. The curtain airbag of claim 5 adapted for mounting with at least a portion of the cushion adjacent to an upper edge of the window and the cushion deploys downward toward a lower edge of the window.

9. The curtain airbag of claim 5 wherein the edge is secured to the cushion at a location that, when the cushion is inflated, is below an upper edge of the window.

10. A curtain airbag installed in a motor vehicle, comprising:
    a cushion having a pre-inflation position adjacent a roof rail of the vehicle and an inflated position extending downward from the roof rail and overlying a window; and
    a sheet having an edge secured to an outboard side of the cushion at a location that, when the cushion is in the inflated position, is below an upper edge of the window, the sheet having a pre-deployment position wherein a portion distal from the edge is folded and positioned adjacent to an inboard side of the cushion in the pre-inflation position, such that movement of the cushion to the inflated position urges the sheet to a deployed position between an outboard-facing surface of the cushion and the window.

11. The curtain airbag of claim 10 wherein at least one attachment point on the edge is co-located with a zero-length tether connecting an inboard panel and an outboard panel of the cushion.

* * * * *